March 7, 1939.  H. A. WOOFTER  2,149,654
ELECTRIC WELDING APPARATUS
Filed Feb. 19, 1936  2 Sheets-Sheet 1
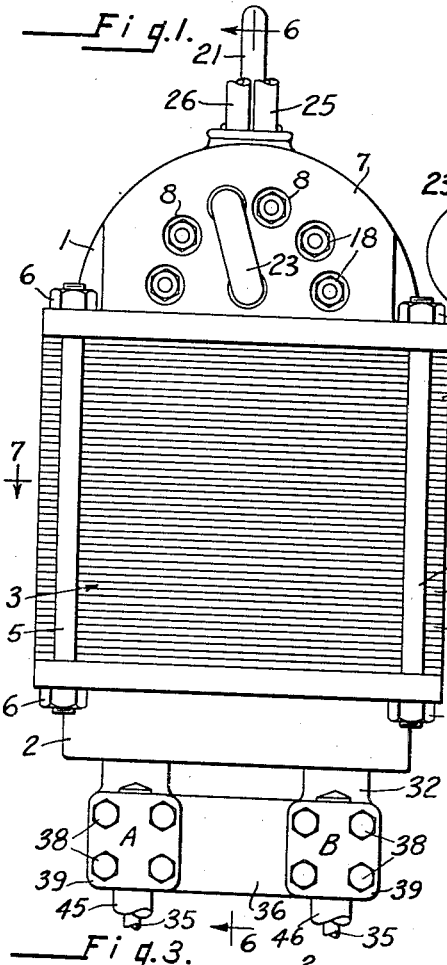
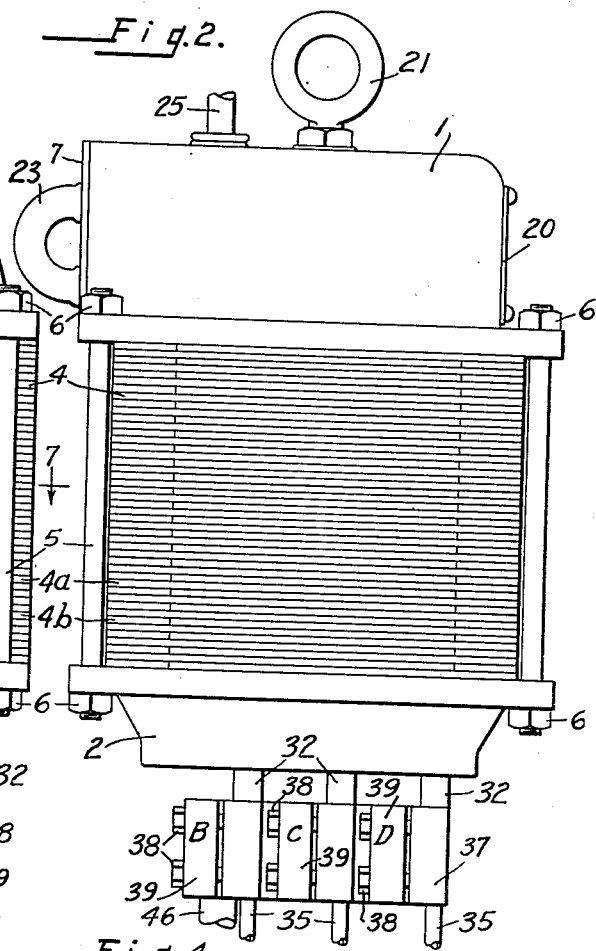
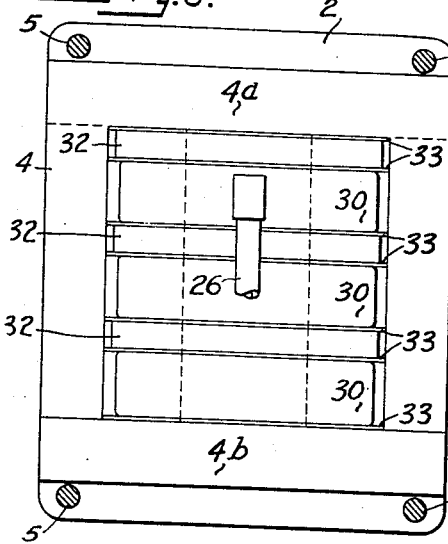
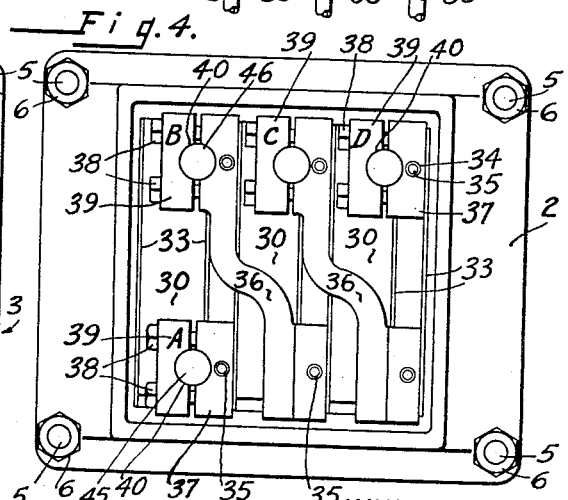
INVENTOR
HERBERT A. WOOFTER.
BY
ATTORNEYS

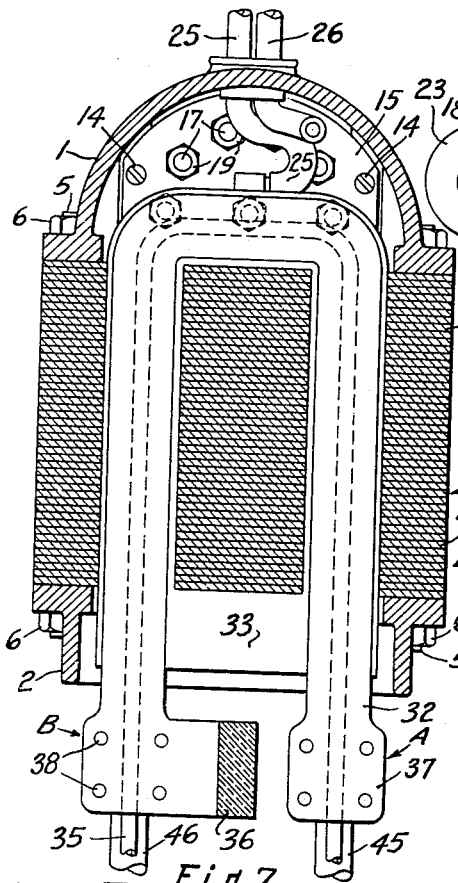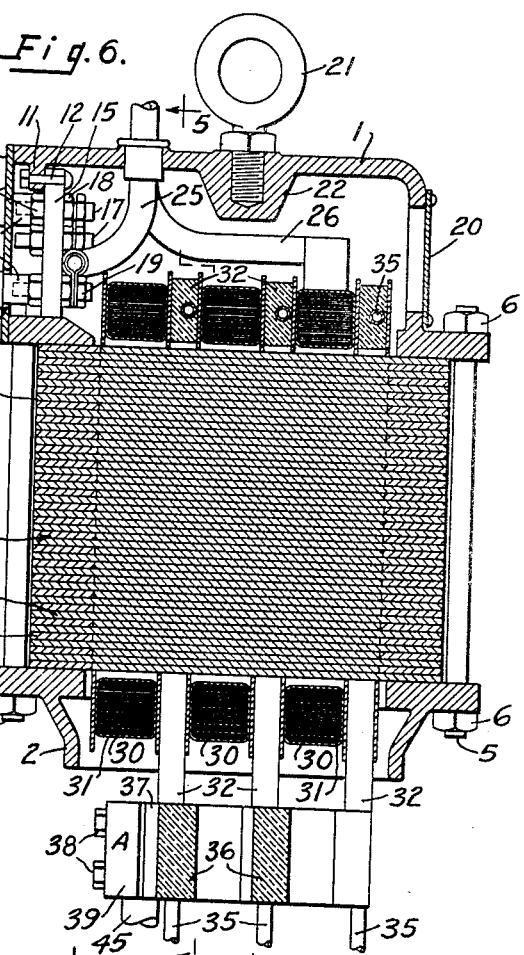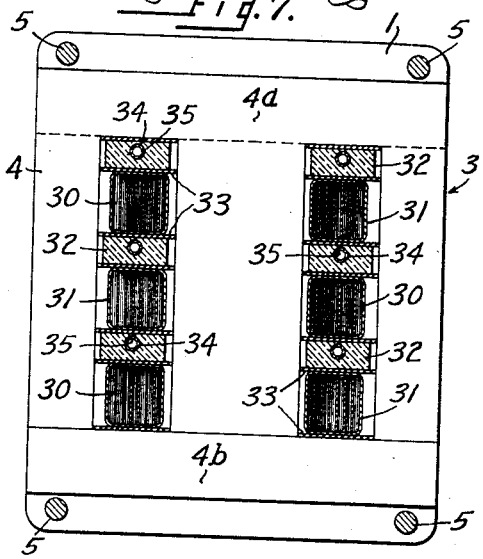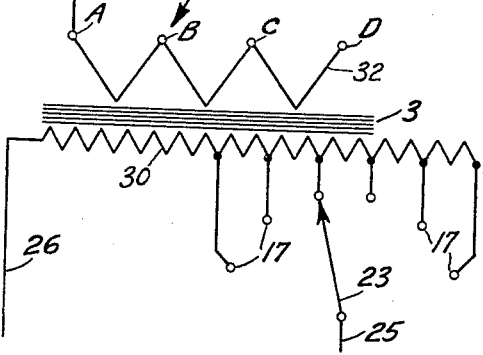

Patented Mar. 7, 1939

2,149,654

UNITED STATES PATENT OFFICE 2,149,654

ELECTRIC WELDING APPARATUS

Herbert A. Woofter, Detroit, Mich., assignor to Swift Electric Welder Company, Detroit, Mich., a corporation of Michigan Application February 19, 1936, Serial No. 64,727

4 Claims. (Cl. 171—119)

This invention relates to electric welding apparatus and has for its object to provide electric transformer means, especially adapted for use in welding.

It is an object of this invention to provide a method, whereby a single, double, triple or a greater range of secondary voltages and currents may be obtained, as desired, from a single transformer.

It is a further object of this invention to provide a method for obtaining such ranges of secondary voltages and currents by manipulation of a single regulator switch in an electric transformer.

It is a further object of the invention to provide an electric transformer construction, whereby a single or multiple range of secondary voltages and currents may be obtained by the manipulation of a regulator switch on the transformer.

It is a further object of the invention to provide a transformer construction, especially adapted for use in the welding industry and particularly where the transformer is to be located at variable distances from the actual point of weld, which transformer construction is also useful in the electrical heating of rivets, cross-welding of rods and wire, and which is adapted for many other and widely varying uses and also, in the welding industry, where there is a wide range of sizes or gauges of work to be welded.

It is a further object of the invention to provide a transformer construction which is particularly adapted for use in that type of welding known as "gun welding", where flexible leads are brought from the secondary terminals of the transformer to the gun welder in the hands of the operator, and where the length of these leads may vary, for instance, from four to ten or twelve feet in length, depending upon the particular job at hand, and where a comparatively low range of secondary voltages and currents is required with short leads, while substantially a higher range of secondary voltages and currents is required to compensate for lead drops and inductive losses with the use of longer leads, the ranges of secondary voltages and currents varying in direct proportion with the length of the leads used.

These and other advantages will appear from the following description taken in connection with the drawings, in which a preferred embodiment is shown for the purpose of illustration.

In the drawings:

Figure 1 is a side elevational view of a transformer constructed according to my invention;

Figure 2 is a front elevation of the transformer illustrated in Figure 1;

Figure 3 is a top plan view of the transformer taken with the top casting 1 and associated parts removed;

Figure 4 is a bottom plan view of the transformer, as shown in Figure 2;

Figure 5 is a sectional view in elevation taken on the line 5—5 of Figure 6;

Figure 6 is a sectional view in elevation, taken on the line 6—6 of Figure 1;

Figure 7 is a sectional view, taken on the line 7—7 of Figure 1;

Figure 8 is a diagrammatic view of the electrical circuit of the transformer of my invention.

It was formerly necessary to provide a multiplicity of transformers, auto transformers and double regulator switches to take care of widely varying conditions of leads and work. With my invention, one transformer will take care of a wide range of work, formerly requiring three or more transformers, with great economy in first cost, operating cost, and floor or suspension space required.

As illustrated, particularly in Figures 1 to 7 inclusive, the main body of the transformer of my invention comprises a top casting 1, a bottom casting 2 and a core 3 made up of laminations 4, each of which laminations comprises a comb-shaped plate 4a having three legs and a rectangular strip 4b having one longitudinal edge thereof in abutment with the legs of the plate 4a. The laminations 4 as indicated, particularly in Figure 3, are oppositely disposed so that in the alternate laminations the rectangular strips 4b are disposed respectively at the front and at the rear of the core 3, which core is clamped between the top and bottom castings by a plurality of clamping bolts 5 having nuts 6 at either end. In the embodiment illustrated in the drawings, four of these clamping bolts 5 are used. Secured in any suitable manner at one end of the top casting 1 is a regulator switch cover 7, preferably consisting of suitable material and having a plurality of holes 8. Seven holes are shown in the illustrated embodiment, six of which are radially and equidistantly disposed with respect to the seventh. This arrangement, of course, is merely illustrative. Depending from the top wall of the top casting 1 is a flange 11 (Figure 6), to which is suitably secured by any suitable means, such as the bolt 12 and screws 14, a non-conducting or insulating switch plate or panel 15, which is disposed in parallelism with the regulator switch cover 7 and having thereon a plurality of contacts arranged in registration with the holes 8 in the regulator switch cover 7, which contacts each comprise screw-threaded conducting studs 17, each having a pair of lock nuts 18 threaded thereon, by which they are secured in suitably arranged bores in the switch panel 15, which panel may be referred to as the switch contact supporting panel. On each of the studs 17 at the rear end thereof is a terminal nut 19 for the purpose of securing tap leads and terminals thereto, as will be hereafter described. The forward ends of the studs 17 are unthreaded and preferably machined for a purpose which will be hereafter described.

At the opposite side of the top casting 1 is suitably secured a plate 20, which may be removed to provide access to the interior of the top casting. Locked into the top wall of the top casting 1 is an eye-bolt 21, screw-threaded at its lower end for engagement with suitable screw threads in the boss 22 of the top casting 1, which eye-bolt 21 provides means for suspending the transformer from an air hoist, train, trolley or in any manner which may be found desirable.

Adapted to be selectively connected between the central one of the studs 17 and any desired one of the six other studs 17 is a suitable selector switch key member 23, which may comprise a length of flexible cable having suitable plug members 24 at the ends thereof and having the central portion thereof covered with any suitable insulating material. Plug members 24 have suitable bores therein, adapted to snugly engage the forward ends of the studs 17, when placed thereon. It is to be understood that any other suitable construction of selector switch may be used, such as a rigid construction thereof. The primary lead 25 is attached to the centrally located stud 17, as shown particularly in Figure 6, while the other primary lead 26 is suitably connected to the end of the multiple primary coil, as also shown in Figure 6. The multiple primary coil is shown as a three-coil primary winding, which is tapped at suitable intervals, the taps being connected by suitable leads to the six radially disposed studs 17 of the selector switch and secured thereto by the respective terminal nuts 19 in the same manner as the primary lead 25 is secured to the centrally located stud 17.

It is to be understood, of course, that in carrying out my invention, I may use any desired number of primary coils, each of which coils may be provided with as many taps as may be found desirable, and that I may use any number of contacts on my selector switch in order to accommodate the connection thereto of the leads from the tapped primary coils. The taps and leads have been omitted from the illustration for the sake of clearness. As shown particularly in Figures 6 and 7, the coils 30 of the primary winding are covered with suitable insulation 31 and are spaced apart by the turns 32 of the secondary coil, which turns, as shown in Figure 5, are in the form of thick U-shaped plates of copper or the like, which are separated from the coils of the primary winding by suitable sheet insulation 33. The turns 32 have concentrically disposed bores 34 therein for the reception of cooling fluid conduits 35. The turns of the secondary coils are connected in series by the connector bars 36 suitably secured to the lower ends thereof in the manner shown in Figure 4, which connector bars will be referred to as contact connector bars, because of the function performed thereby. Each of the end or outwardly disposed turns of the secondary coil has a terminal contact block 37 rigidly attached thereto, while one end of a contact connector bar 36 is attached to the other end thereof. Adjustably secured to each of the terminal contact blocks 37 and to one end of the respective contact connector bars 36 by suitable means, such as screw bolts or studs 38, are adjustable clamping blocks 39 (Figures 4 and 6), which blocks have grooves 40 formed in one side thereof, which cooperate with similar grooves in the terminal contact blocks and ends of the connector bars, to which they are attached, to form a circular clamp for the reception of the ends of the movable secondary leads.

While the above description and the drawings relate to a six-point regulator switch and a single, double and triple arrangement of secondary coils, it is to be understood that my invention includes the use of any desired number of regulator switch points and any desired number of primary coil taps and any desired number of turns in the secondary coil, whereby to secure any desirable range of secondary voltages.

*Operation*

With reference particularly to the diagrammatic showing of Figure 8, it will be seen that the ratio between the primary and secondary voltages depends upon the amount of primary coil inserted by manipulation of the selector switch key 23 in the circuit between the primary leads 25 and 26, and also upon the number of turns of the secondary coil inserted in the circuit between the secondary leads 45 and 46. This latter adjustment is accomplished by the insertion of the respective leads 45 and 46 in the desired clamps A, B, C or D, as designated in Figures 4 and 8, so as to include in the circuit between the secondary leads 45 and 46, either one, two or three turns of the secondary coil. The respective clamps are designated by the reference letters A, B, C and D on the diagram of Figure 8 and on the adjustable clamping blocks 39 in Figure 4. It will be seen that the secondary lead 45 may be clamped in the clamp A, and the secondary lead 46, if clamped in the clamp B, includes in the circuit between the leads one turn of the secondary coil; while, if the lead 46 be clamped in the clamp C, then two turns are included in the circuit; while, if it desired to include three turns of the secondary coil in the circuit between the leads 45 and 46, the lead 46 is clamped in clamp D.

Another advantage of my invention, which will clearly appear, is that if one of the end coils be burned out or defective or the clamp thereon be defective, then it is possible to omit this turn from the coil and connect the secondary lead 45 in the clamp B, for instance, and the secondary lead 46 in either of clamps C or D. It is thus seen that the ratio between the primary voltage and the secondary voltage, and thus the ratio between the primary current and the secondary current, may be varied at will by the above-described manipulation of the selector switch key 23 and the selection of suitable clamps for the secondary leads 45 and 46 within widely varying limits, as desired. It will be understood that the current ratios vary substantially inversely with respect to the voltage ratios and that, by decreasing the voltage delivered, the current delivered is increased.

Due to the fact that substantial heat is generated in a transformer in use, I have provided cooling means comprising the cooling fluid conduits 35 arranged centrally of the respective turns of the secondary coil through which conduits, cooling fluid is forced during use of the transformer. The conduits are preferably connected in series so that a constant flow of fluid, such as water, may be continuously forced through the central bores 34 of the secondary turns 32 during use of the transformer, whereby to carry off the heat generated in the transformer. It is to be noted that the cooling fluid conduits 35 are located at the point of the greatest heat generation, whereby the utmost cooling efficiency is attained. Any suitable pressure means may be used for forcing the cooling fluid through the path defined by the cooling fluid conduits 35.

It will be understood that I desire to comprehend within my invention such modification as come within the scope of the claims and the invention.

Having thus fully described my invention, what I claim as new and desire to secure by Letters Patent is:

1. An electric transformer comprising a support having a selector switch with a plurality of contacts thereon, one of which contacts is adapted to have a primary lead attached thereto, a core, a tapped primary winding in said transformer having its taps connected to said other contacts, said winding being adapted to have a second primary lead attached thereto, said transformer also having therein a secondary winding consisting of a plurality of U-shaped bars adapted to have secondary leads attached thereto, said U-shaped bars having liquid conduits extending through the interior thereof, and means for conducting liquid to and from said conduits whereby the ratio between the voltage supply and the voltage delivery may be varied by changing the inductance of said primary winding through operation of said switch.

2. An electric transformer comprising a support having a selector switch with a plurality of contacts thereon, one of which contacts is adapted to have a primary lead attached thereto, a core, a tapped primary winding in said transformer having its taps connected to said other contacts, said winding being adapted to have a second primary lead attached thereto, said transformer also having therein a multiple turn secondary winding consisting of a plurality of U-shaped bars, a plurality of clamps adapted to connect the free ends of said U-shaped bars to form said secondary winding, and means for selectively connecting secondary leads to predetermined positions along said secondary winding to include one or more turns therebetween, whereby the ratio of the voltage supply to the voltage delivery may be varied by changing the location of said secondary leads and also by changing the inductance of said primary winding through operation of said switch.

3. An electric transformer comprising a core, a primary winding and a secondary winding consisting of a plurality of U-shaped bars with liquid conduits extending through the interior thereof, means for conducting liquid to and from said conduits, and means for electrically connecting the free ends of said U-shaped bars to form said secondary winding.

4. An electric transformer comprising a core, a primary winding and a secondary wnding consisting of a plurality of U-shaped bars with the free ends thereof exposed, connectors for electrically interconnecting the free ends of said U-shaped bars to form said secondary winding, and clamping means associated with the exposed portions of said secondary winding for selectively connecting thereto secondary leads at predetermined positions therealong for pre-selecting a predetermined member of said U-shaped bars to form the active portion of said secondary winding, whereby to vary the number of turns of the secondary winding of said transformer by adjustments externally thereof.

HERBERT A. WOOFTER.